Figure 1:
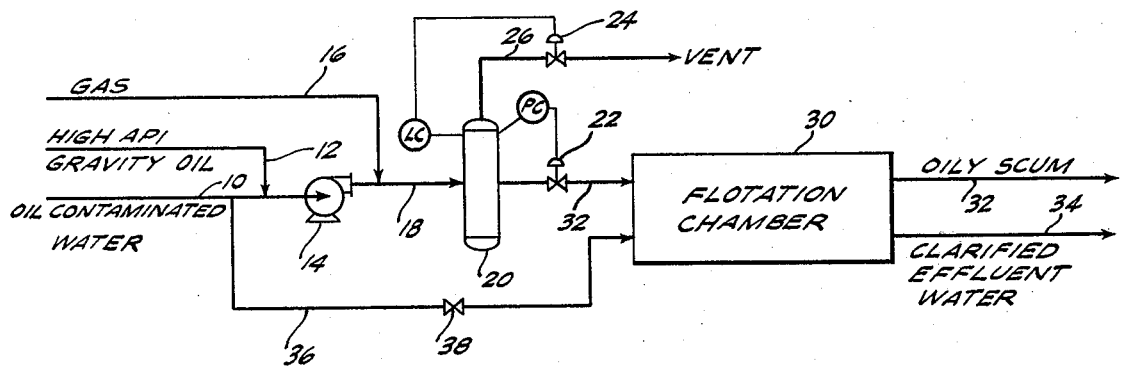

United States Patent [19]

Traylor

[11] 3,884,803
[45] May 20, 1975

[54] PROCESS FOR SEPARATING LOW API GRAVITY OIL FROM WATER

[75] Inventor: Verlon L. Traylor, Casper, Wyo.

[73] Assignee: Union Oil Company of California, Brea, Calif.

[22] Filed: June 23, 1972

[21] Appl. No.: 265,649

[52] U.S. Cl. .................................. 210/44; 210/83
[51] Int. Cl. ............................................ B01d 17/02
[58] Field of Search ........ 210/44, 83; 252/328, 329, 252/330

[56] References Cited
UNITED STATES PATENTS

| | | | |
|---|---|---|---|
| 2,047,989 | 7/1936 | Woelflin | 252/329 X |
| 2,702,794 | 2/1955 | Kellogg | 252/329 |
| 2,793,751 | 5/1957 | Broidrick | 210/83 |
| 3,647,069 | 3/1972 | Bailey | 210/44 |
| 3,723,309 | 3/1973 | Garcia | 210/44 |

*Primary Examiner*—Charles N. Hart
*Assistant Examiner*—Benoit Castel
*Attorney, Agent, or Firm*—Dean Sandford; Richard C. Hartman

[57] ABSTRACT

A process for separating low API gravity oil from water in which a small amount of a high API gravity oil is added to the oil-contaminated water and the mixture thereafter contacted with finely divided gas bubbles to float the oil and included particulate solid matter to the surface for mechanical separation. A low oil-content product water suitable for discharge into public waters or sewer systems, or for use in industrial and agricultural applications is produced.

11 Claims, 3 Drawing Figures

PROCESS FOR SEPARATING LOW API GRAVITY OIL FROM WATER

This invention relates to the treatment of contaminated water, and more particularly concerns the removal of low API gravity oil from oil-contaminated water.

Water contaminated with small amounts of oil is a byproduct of many industrial operations such as, for example, the production of crude petroleum and natural gas, the refining of petroleum, and in chemical, food and metal processing operations. These waters may also contain various suspended particulate solid material and other dissolved contaminents. The oil may be present in the form of water external emulsions, which increases the difficulty of separating the oil from the water. The oil content of oil-contaminated water must be reduced to acceptable levels before it can be discharged to public water ways and sewers, or before reuse in industrial or agricultural applications.

Various types of oil-water separators such as, for instance, the widely used API gravity-type separators, have been developed to remove oil from water streams. In a great many operations, the degree of oil removal that is obtained by gravity separation is quite adequate to provide the desired water quality. However, where the water quality standards are more stringent, or the separation more difficult, gravity separation alone is inadequate to obtain the necessary oil removal and secondary treatment is required, one common secondary treatment being gas flotation.

Two basic types of gas flotation processes are employed for oil-water separation. In one type of process, all or a portion of the oil-contaminated water, or a portion of the effluent water, is admixed with gas at an elevated pressure so that gas is dissolved in the water. The water containing the dissolved gas is introduced into a flotation chamber maintained at a lower pressure causing the gas to effervesce, forming finely divided bubbles tending to float the oil to the surface where it can be removed by mechanical means. In the other type of process commonly employed, gas is mechanically dispersed into the oil contaminated water in the form of very fine bubbles. In either process, oil and included solids are floated to the surface and mechanically separated, thereby producing an effluent water of substantially reduced oil content.

While these flotation processes have proven effective in removing higher API gravity oils from oil-contaminated water, they have not been as effective in separating lower gravity oils, such as oils having API gravities of about 20°, and lower. Thus, the oil contents of the effluent water from flotation processes treating water contaminated oils have often times not been reduced to levels acceptable for discharge to public water ways or sewers, or for reuse in industrial and agricultural applications. Hence, need exists for an efficient, economical method for treating water contaminated with low API gravity oil to reduce the oil content to acceptable levels.

Accordingly, it is a primary object of this invention to provide a process for removing low API gravity oil from oil-contaminated water.

Another object of this invention is to provide a process for removing oil from water contaminated with oil having an API gravity of 20° or lower.

Still another object of the invention is to provide an improved flotation process particularly useful for treating water contaminated with low API gravity oil.

A yet further object of the invention is to provide a modified method of operating existing gas flotation treaters to facilitate more nearly complete separation of low API gravity oils from the oil-contaminated water.

Other objects and advantages of the invention will be apparent from the following description of the invention.

Briefly, this invention contemplates a process for separating low API gravity oil from water in which a small amount of a high API gravity oil is added to the oil-contaminated water and the mixture thereafter contacted with finely divided gas bubbles to float the oil and included particulate solid matter to the surface for mechanical separation. A clarified effluent water of reduced oil content suitable for discharge into public waters or sewer systems, or for use in industrial and agricultural applications is produced.

Figure 2:
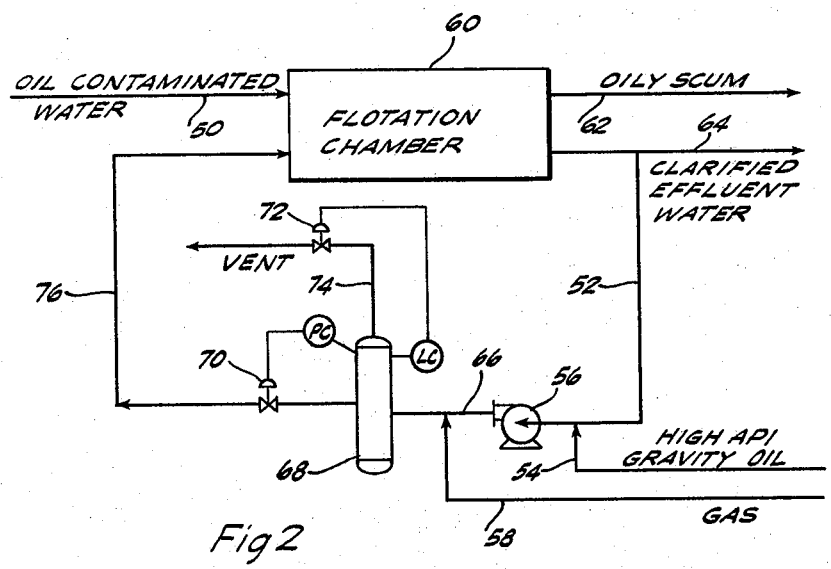
Figure 3:
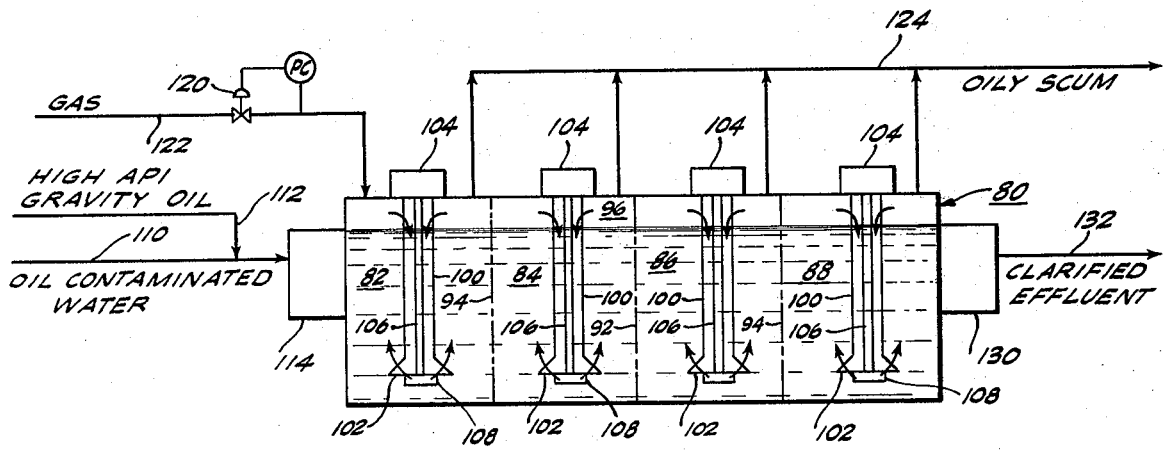

The invention will be more readily understood by reference to the accompanying drawings, in which:

FIG. 1 is a schematic flow diagram illustrating the practice of the method of this invention in conjunction with a gas solution flotation process for the separation of oil from water in which the high API gravity oil and gas is added alternatively to either all of the contaminated water or to only a portion thereof;

FIG. 2 is a schematic flow diagram illustrating the practice of the method of this invention in conjunction with a gas solution flotation process for the separation of oil from water in which the high API gravity oil and gas is added to a portion of the clarified effluent water from the flotation chamber and this mixture recycled to said chamber; and FIG. 3 is a schematic flow diagram illustrating the practice of the method of this invention in conjunction with a mechanically dispersed gas flotation process for the separation of oil from water.

The gas flotation process utilized in the separation of dispersed solids and immiscible liquids from a continuous liquid phase involves contacting the continuous liquid phase with finely dispersed gas bubbles. These finely dispersed bubbles are attached to the suspended particle by adhesion due to the intermolecular attraction existing between the gas and suspended particle, and/or by physical capture, which involves the trapping and growing of rising bubbles within the particle floc. The rate of a particle moving through a fluid is described by Stokes' Law, wherein:

$$V_T = \frac{g(\rho_L - \rho_P) D^2}{18\mu}$$

in which $V_T$ is the rate of rise of the particle,
$D$ is the diameter of the particle,
$g$ is the gravity constant,
$\rho_L$ is the density of the liquid in the continuous phase,
$\rho_p$ is the density of the particle, and
$\mu$ is the viscosity of the liquid in the continuous phase.

During flotation operations, the attachment of the dispersed gas bubbles to the suspended particle reduces the particle density, $\rho_p$, thereby producing a faster rate of rise which facilitates separation of suspended particles, either solid or liquid, from the continuous liquid phase. In many instances it is desired to reduce the oil content of an oil-contaminated water to less than 20 ppm of oil, and preferably to less than 10 ppm. It has been found that the separation of oil from water by gas flotation becomes progressively more difficult as the density of the oil is increased, and that in many cases the oil content of water contaminated with an oil having an API gravity of 20° or less cannot be reduced to satisfactory values by the conventional gas flotation processes.

The addition of a small quantity of a high API gravity oil to water contaminated with low API gravity oil greatly facilitates the separation of the oil and included particulate solid matter from the water. The oils found most useful in facilitating this separation are oils exhibiting an API gravity above about 35°, and particularly crude petroleum exhibiting an API gravity above about 35°.

Although it is not known with certainty whether the high API gravity mixes with the low API gravity oil to decrease the density of the oil, $\rho_L$, or primarily affects the particle diameter, D, or acts as a flocculating agent to coalesce individual oil particles, it has nevertheless been demonstrated that the addition of a small amount of high API gravity oil to a water contaminated with low API gravity oil improves the separation of oil by gas flotation.

The term "API gravity" as employed herein means the gravity of a liquid material expressed as degrees API and determined in accordance with ASTM test method D 287-67 entitled "Standard Method of Test for API Gravity of Crude Petroleum and Petroleum Products (Hydrometer Method)," ASTM Standards, American Society for Testing Materials, Part 17, November, 1970, pages 136–139, which procedure is herein incorporated by reference.

The method of this invention can be practiced with both the gas solution type processes in which gas, at an elevated pressure, is dissolved in all or a portion of the oil-contaminated water, or in a portion of the effluent water, and the gas containing water introduced into a flotation chamber maintained at a lower pressure, or with the mechanically dispersed gas flotation type processes.

A continuous process employing the method of this invention in conjunction with one mode of gas flotation process is illustrated in FIG. 1. In the practice of this invention, the oil-contaminated water flowing through conduit 10 and a controlled amount of high API gravity oil flowing through conduit 12 are admixed at the suction of pump 14. Gas is introduced through conduit 16 into pump discharge conduit 18, and this mixture introduced into pressurization tank 20, which is maintained at a pressure of about 20 to 100 psig, and usually from about 30 to 50 psig, by means of pressure control valve 22. Tank 20 provides sufficient retention time to permit the gas to dissolve in the liquid. Excess gas is vented through valve 24 in vent pipe 26. The mixture of oil-contaminated water and high API gravity oil having the gas dissolved therein is introduced into flotation chamber 30 through the conduit 32. Flotation chamber 30 is maintained at a pressure lower than the gas pressurization pressure, causing the gas to effervesce and form minute bubbles which float the particulate solids and immiscible liquids to the surface. The oily scum or froth containing both the oil and the solid matter is removed from the surface by mechanical skimming and withdrawn from flotation chamber 30 through conduit 32. Clarified effluent water is withdrawn through conduit 34.

In another modification of this process, the high API gravity oil and gas are admixed with only a portion of the oil-contaminated water, with the remainder of the oil-contaminated water being introduced directly into flotation chamber 30 through conduit 36 having valve 38 therein. This modification has the advantage that pump 14 and the attendant equipment piping and gas pressurization equipment can be of smaller size.

Another gas solution flotation process employing the method of this invention is illustrated in FIG. 2. In the practice of this mode of the invention, oil-contaminated water flowing through conduit 50 is introduced directly into flotation chamber 60, the oily scum or froth containing both the floated oil and the solid matter is removed from the surface by mechanical skimming and withdrawn from the flotation chamber through conduit 62. Clarified effluent water is withdrawn through conduit 64. However, in this mode of practicing the invention a portion of the clarified effluent water is withdrawn through conduit 52 and a controlled amount of high API gravity oil flowing through conduit 54 is admixed with the clarified effluent water at the suction of pump 56. Gas is introduced through conduit 58 into pump discharge conduit 66, and this mixture introduced into pressurization tank 68 in a manner similar to that employed in pressurizing the oil-contaminated water in the process described above. Pressure is maintained in pressurization tank 68 by means of pressure control valve 70, and excess gas is vented from the pressurization tank by vent valve 72 in vent pipe 74. The mixture of clarified effluent water and high API gravity oil having the gas dissolved therein is introduced into flotation chamber 60 through conduit 76, and is admixed with the oil-contaminated water in the flotation chamber, which is maintained at a pressure lower than the gas pressurization pressure. On introduction into the flotation chamber, the gas effervesces from the aqueous solution and forms finely divided bubbles carrying the particulate solid and immiscible liquids to the surface.

In the gas solution flotation processes, the flotation chamber may be operated at any super-atmospheric pressure lower than the gas solution pressure, or at a sub-atmospheric pressure. However, it is usually preferred that the pressure in the flotation chamber be essentially atmospheric.

FIG. 3 illustrates the practice of the method of this invention in conjunction with a mechanically dispersed gas flotation process. In the practice of this embodiment of the invention, the flotation operation is conducted in a closed, elongated tank 80 containing a plurality of individual chambers, such as the four chambers 82, 84, 86 and 88 illustrated in FIG. 3, which are formed by the partial internal baffles 90, 92 and 94. The partial baffles provide a common gas space 96 above the chambers, and permit the flow of water sequentially through the chambers from the inlet to the outlet of the tank. Each chamber is provided with a vertical standpipe 100 which is in communication with gas space 96 and terminates at its lower end in a flared perforate hood or deflector 102. An electric motor 104 is mounted on the top of tank 80 above each of the flotation chambers. A shaft 106 extends downwardly through the vertical standpipes 100, each shaft having a rotor 108 mounted adjacent to the lower terminus of the standpipe.

Oil-contaminated water flowing through conduit 110 and a controlled amount of high API gravity oil flowing through conduit 112 are admixed and introduced into inlet box 114 of tank 80, from which the mixture flows into the first of the sequentially arranged chambers. A blanket of gas at a low positive pressure is maintained in gas space 96 by means of pressure control valve 120 located in gas supply line 122. Usually a slight positive pressure of up to about 10 ounces is maintained on tank 80, however, where air is employed as the flotation gas, it is possible to employ an open topped tank and conduct the process at atmospheric pressure.

The rotors 108 are rotatively driven through shafts 106 by the motors 104, causing the rotors to force water through a perforate disperser or shield, not shown, surrounding the rotor, thereby creating a reduced pressure in stand pipes 100. This reduced pressure allows gas to be drawn from gas space 96 above the water layer down the inside of the standpipe to the rotor. The rotor forces the gas into the water, and as it travels at a high velocity through the disperser a shearing force is created that causes the gas to form minute bubbles. As these bubbles rise to the surface, oil and included solid particles are attached to the interface of the gas bubble. When the gas bubble breaks the liquid surface, the oil and solid materials are left at the surface, and gas is returned to gas space 96 for recirculation.

The mixture of oil-contaminated water and high API gravity crude oil passes sequentially through the four serially arranged flotation chambers 82, 84, 86 and 88, undergoing four separate oil separation stages. In this manner, the oil content of the water is progressively reduced. The oily scum or froth containing both the oil and the solid matter is removed from the surface of each flotation chamber and is withdrawn from tank 80 through conduit 124, which is typically arranged at the side of the tank for gravity flow from the surface to a suitable disposal site. Clarified effluent water passes from the last of the flotation chambers into outlet box 130, from where it is withdrawn through the conduit 132.

Any gas which can be dissolved in water at reasonable pressurization pressures and which effervesces from the water at a lower pressure can be employed in the practice of the above described gas flotation processes. Suitable gases include air, nitrogen, natural gas, methane, ethane and propane, with air and natural gases being preferred in many operations.

In the foregoing gas flotation processes, the separation of low API gravity oil, i.e., oil having an API gravity of less than 20°, from water, can be substantially improved by the addition of a minor proportion, such as about 1 to 10 volumes, and preferably about 2 to 5 volumes, of high API gravity oil to the oil-contaminated water per volume of low API gravity oil in the contaminated water. The oil content of the clarified effluent water usually can be reduced to less than about 20 ppm, and in some instances to less than about 10 ppm. An effluent water of this quality, unless contaminated by other undesirable constituents, can usually be discharged into public waterways and sewers, and can be used in various industrial and agricultural applications.

It is preferred that the oil-contaminated water treated by gas flotation be first processed through a gravity-type separator to provide a gross oil separation. Also, in some instances the oil-content of the clarified effluent water from the gas flotation separator can be further reduced by processing the effluent water through a subsequent gravity-type separator.

Also, it is known that oil separation in the flotation chamber usually can be improved by the addition of certain flocculating and/or foaming agents to the oil-contaminated water input to the flotation chamber. Hydrated aluminum sulfate and ferrous sulfate are common flocculating agents used in gas flotation processes. These agents react with the natural alkalinity in the water to precipitate hydrous oxides that tend coagulate the dispersed oil and solid particles in the contaminated water. A wide variety of foaming agents, such as for example the ethoxylated alkyl sulfates, can be used to increase the foaming or frothing action of the dispersed gas bubbles.

The invention is further described by the following example which is illustrative of a specific mode of practicing the invention and is not intended as limiting the scope of the invention defined by the appended claims.

In the exemplary process, approximately 10,000 barrels per day of water contaminated with 15° to 18° API crude petroleum and suspended particles of clay is processed through a first gravity separator to remove a portion of the oil. The oil content of the contaminated water is reduced to about 200 ppm by this gravity separation, and the effluent water from the gravity separator is next processed through a mechanically dispersed gas flotation separator of the type generally illustrated in FIG. 3. Natural gas is used as the flotation gas, and a gas pressure of about 3 ounces above atmospheric pressure is maintained in the gas space. Oil and solids are floated to the surface and removed by mechanical skimming. The oil content of the effluent water from the gas flotation separator is about 50 ppm and is not of satisfactory quality for disposal.

Approximately 2 barrels per day of a paraffin crude petroleum having an API gravity of about 40° is continuously added to the oil-contaminated water entering the gas flotation separator. This is equivalent to about 4 volumes of high API gravity oil per volume of oil in the oil-contaminated water. The oil content of the effluent water from the gas flotation separator is reduced to about 12 ppm. This effluent is then passed through a second gravity separation tank where an additional small volume of oil is separated. The final clarified effluent water is clear and bright in appearance and has an oil content of about 2 ppm or less. This effluent water is satisfactorily used for watering cattle and for crop irrigation.

Various embodiments and modifications of this invention have been described in the foregoing description and examples, and further modifications will be apparent to those skilled in the art. Such modifications are included within the scope of this invention as defined by the following claims.

Having now described the invention, I claim:

1. In a process for treating water contaminated with low API gravity oil to remove the oil continment therefrom wherein said contaminated water is contacted with finely divided gas bubbles in a flotation chamber to float the oil to the surface of said water, oil is mechanically removed from the surface of said water and water having reduced oil contamination is withdrawn from said flotation chamber, the improvement which comprises adding to said contaminated water prior to its introduction into said flotation chamber about 1 to 10 volumes of a high API gravity crude petroleum per volume of said low API gravity oil, said high API gravity crude petroleum having an API gravity above about 35°.

2. The process defined in claim 1 wherein said low API gravity oil contaminant has an API gravity of less than about 20°.

3. A process for removing low API gravity oil from oil-contaminated water, which comprises;

adding a high API gravity crude petroleum having an API gravity above about 35° to said oil-contaminated water in the proportion of about 1 to 10 volumes of said high API gravity crude petroleum per volume of low API gravity oil in said contaminated water;

introducing said oil-contaminated water and high API gravity crude petroleum mixture into a flotation chamber;

dispersing finely divided gas bubbles into said oil-contaminated water and high API gravity crude petroleum mixture in said flotation chamber whereby oil is floated to the surface of said water;

removing oil and/or particulate solid material from the surface of said water; and withdrawing water having a reduced oil content from said flotation chamber.

4. The process defined in claim 3 wherein said high API gravity crude petroleum is admixed with a portion of said water withdrawn from said flotation chamber, and said gas is admixed with said high API gravity crude petroleum and water mixture at an elevated pressure so as to dissolve said gas in said mixture, and wherein said mixture containing dissolved gas is recycled to said flotation chamber maintained at a lower pressure and admixed with said contaminated water therein whereby finely divided gas bubbles are formed.

5. The process defined in claim 3 wherein said flotation chamber is maintained at substantially atmospheric pressure.

6. The process defined in claim 3 wherein said gas is natural gas or air.

7. The process defined in claim 3 wherein said finely divided gas bubbles are mechanically dispersed into said oil-contaminated water and high API gravity crude petroleum mixture.

8. The process defined in claim 3 wherein gas is admixed with said oil-contaminated water and high API gravity crude petroleum mixture at an elevated pressure so as to dissolve said gas in said oil-contaminated water and high API gravity crude petroleum mixture, and wherein said mixture containing dissolved gas is introduced into said flotation chamber maintained at a lower pressure whereby finely divided gas bubbles are formed in said mixture.

9. The process defined in claim 7 wherein said mixture of oil-contaminated water and said high API gravity crude petroleum is passed through a plurality of successive contacting zones in said flotation chamber and wherein said mixture is contacted with finely divided gas bubbles in each of said contacting zones.

10. The process defined in claim 8 wherein said high API gravity crude petroleum is added to only a portion API gravity crude petroleum and wherein gas is dissolved in said mixture of high API gravity crude petroleum and said portion of said oil-contaminated water and said portion containing dissolved gas and a gas-free portion of said oil-contaminated water are admixed in said flotation chamber.

11. A process for removing low API gravity oil from oil-contaminated water, which comprises:

adding crude petroleum having an API gravity above about 35° to said oil-contaminated water in the proportion of about 2 to 5 volumes of said crude petroleum per volume of low gravity oil in said contaminated water;

introducing said oil-contaminated water and crude petroleum mixture into a closed flotation chamber blanketed with natural gas maintained at a pressure slightly above atmospheric pressure;

passing said oil-contaminated water and crude petroleum mixture through a plurality of successive contacting zones in said flotation chamber;

dispersing finely divided bubbles of natural gas into said oil-contaminated water and crude petroleum mixture in each of said contacting zones whereby oil and/or particulate solid material is floated to the surface of said water;

removing oil and/or particulate solid material from the surface of said water; and withdrawing a clarified effluent water of reduced oil content from the last of said contacting zones.

* * * * *